United States Patent Office.

BRIERLEY KELSALL RIGBY, OF DITTON, ASSIGNOR OF ONE-HALF TO FRANCIS AUGUSTUS REMINGTON NEILL, OF ST. HELENS, AND AUSTIN COOPER CARR, OF RAINHILL, ENGLAND.

MANUFACTURE OF CEMENT.

SPECIFICATION forming part of Letters Patent No. 526,910, dated October 2, 1894.

Application filed October 14, 1893. Serial No. 488,147. (No specimens.)

*To all whom it may concern:*

Be it known that I, BRIERLEY KELSALL RIGBY, a subject of the Queen of Great Britain, residing at Ditton, near Widnes, in the county of Lancaster, in the Kingdom of England, have invented certain new and useful Improvements in the Manufacture of Cement, of which the following is a specification.

Several patents have been taken out for making cement from the lime mud of the Le Blanc alkali makers, but all these are very expensive owing to the cost of washing and chemically purifying the lime mud. Now I have found that this lime left from the ordinary process of caustic manufacture can be used in cement making without further treatment, and I accomplish this in the following manner: The waste is mixed with clay or other aluminous material used in cement manufacture in the ordinary manner in which chalk is mixed with clay in cement manufacture, is dried and calcined, but instead of being calcined in the ordinary method it is what is commonly called "overburnt" being calcined at such a heat that the material turns a dark color and increases in density. Such overburning with ordinary cement materials would be deleterious but I have found that with this impure material this overburning has the effect of counteracting the injurious effect of the caustic while the caustic appears on the other hand to counteract the usual injurious effect of overburning. The eventual result is a very strong cement. After calcining the material is finely ground and in other ways treated as in ordinary cement manufacture.

As an instance taken from my regular practice, I add three and one quarter parts of caustic makers' waste lime mud to one of a clay having the following analysis:

| | |
|---|---|
| $SiO_2$ | 70. |
| $Al_2O_3$ } $Fe_2O_3$ } | 22.50 |
| $CaCO_3$ | 2.96 |
| MgO | 0.82 |
| Volatile matters | 3.50 |
| | 99.78 per cent. |

This mixture being thoroughly mixed into a slurry with water is dried calcined in a temperature of 1,650°, to 1,700°, centigrade and gives a black heavy clinker. If it were calcined at a less heat the clinker would be bronze color, the usual color of good material made from pure carbonate of lime. I find however that if the clinker be only burned to a bronze color, that is to the degree for making the best cement when pure carbonate of lime is used, the cement made from the lime mud does not set well after grinding and further the hydrate of soda and carbonate of soda efflores out when the cement has dried. If however the material be burned until it has passed the bronzed colored stage and has become heavy black clinker, then I find that it sets well and has no efflorescence though when cement is made with pure carbonate of lime, if it were burned to this heavy black clinker, it would be practically useless.

I declare that what I claim is—

1. The method of manufacturing cement from Le Blanc lime mud which consists in adding clay to the same, calcining until over-burning takes place and grinding as in ordinary cement manufacture.

2. The improvement in the manufacture of cement from Le Blanc lime mud which consists in taking the lime mud direct from the alkali makers and without preliminary treatment mixing it with aluminous materials in the proper proportion for cement making and calcining the same until "overburnt," and grinding as in ordinary cement manufacture.

3. The improvement in the manufacture of cement which consists in making a mixture of carbonate of lime, calcium oxide and soda, combining the same with aluminous materials, calcining the same until overburned and grinding the resulting product.

In testimony whereof I have signed my name to this specification in the presence of two subscribing witnesses.

BRIERLEY KELSALL RIGBY.

Witnesses:
WM. P. THOMPSON,
W. H. BEESTON.